United States Patent [19]

Graton et al.

[11] Patent Number: 4,969,855

[45] Date of Patent: Nov. 13, 1990

[54] TORSION DAMPING DEVICE OF LARGE ANGULAR DISPLACEMENT, PARTICULARLY A FRICTION CLUTCH, ESPECIALLY FOR AN AUTOMOTIVE VEHICLE

[75] Inventors: Michel Graton, Paris; André Dalbiez, Argenteuil, both of France

[73] Assignee: Valeo, Paris, France

[21] Appl. No.: 281,028

[22] Filed: Dec. 7, 1988

[30] Foreign Application Priority Data

Dec. 8, 1987 [FR] France .................................. 87 17072

[51] Int. Cl.[5] .......................... F16D 3/12; F16D 13/68
[52] U.S. Cl. .................................... 464/63; 192/106.2; 464/64; 464/68
[58] Field of Search ................. 192/106.2; 464/63, 64, 464/66, 68

[56] References Cited

U.S. PATENT DOCUMENTS

| | | | |
|---|---|---|---|
| 4,643,288 | 2/1987 | Tomm et al. ..................... | 192/106.2 |
| 4,655,337 | 4/1987 | Carmillet et al. ................. | 464/68 X |
| 4,674,992 | 6/1987 | Carmillet et al. ............ | 192/106.2 X |

*Primary Examiner*—Daniel P. Stodola
*Attorney, Agent, or Firm*—Charles E. Brown; Charles A. Brown

[57] ABSTRACT

A torsion damping device for automotive vehicles, which comprises three coaxial parts (A, B, C) mounted rotatably with respect to each other against the action of circumferentially acting resilient springs, the second part (B) comprises two damper plates (12, 12') which, independently of each other, each comprise an annular member around the hub (10) which constitutes the first part (A), with, between them and the hub (10), relative rotational displacement devices which are arranged alternately as between one damper plate and the other. Circumferentially acting resilient springs (23, 23'), separate from each other, are interposed between, on the one hand, the hub (10) and one of the damper plates (12, 12'), and on the other hand, between the hub (10) and the other damper plate (12', 12).

7 Claims, 5 Drawing Sheets

TORSION DAMPING DEVICE OF LARGE ANGULAR DISPLACEMENT, PARTICULARLY A FRICTION CLUTCH, ESPECIALLY FOR AN AUTOMOTIVE VEHICLE

FIELD OF THE INVENTION

The present invention is concerned, in general terms, with torsion damping devices comprising three coaxial parts mounted so as to be rotatable with respect to each other within the limits of a predetermined angular displacement and against the action of resilient means, commonly referred to as circumferentially acting resilient means, adapted to act circumferentially between them over at least part of a said angular displacement.

The invention is more particularly concerned with a torsion damper in which a first one of the said parts comprises a hub; the second part comprises at least one plate or wheel, commonly called a damper plate, which is in the form of an annular member extending transversely around the said hub with, between it and the hub, relative rotational displacement means; and a third part comprises at least one further plate parallel to the damper plates. Like the damper plates, the (or each) of the plates of the third part is in the form of an annular member extending transversely around the hub, but it is not coupled with the hub.

BACKGROUND OF THE INVENTION

In the document FR-A-2 568 640, an arrangement has been proposed which allows a significant displacement of the maximum possible angular extent to be effected between the second and third parts of such a torsion damping device, while at the same time preserving the mechanical strength of its various components.

In that arrangement, another damper plate, or auxiliary plate, is associated with the first damper plate and is parallel therewith, with, as between these two damper plates, an alternate arrangement of relative rotational displacement means whereby they are engaged with the hub. The effect of this arrangement is that, in a first circumferential direction of relative angular displacement between the first and second parts, one of the said damper plates initially operates by itself, while with the angular displacement in the opposite direciton, it is the other damper plate which initially operates by itself.

In the embodiment described, the circumferentially acting resilient means operative between the first and second parts are the same ones for both of the damper plates.

This arrangement has the disadvantage that, since the damper plates in question are necessarily offset axially, it is desirable, in order to balance out, by symmetry, the forces brought into play, that one of the damper plates be split into two auxiliary plates, which are then mounted on either side of the other damper plate, being connected to each other by axial spacers which pass through the main damper plate via openings formed for this purpose in the latter.

Besides an additional weakening of the mechanical strength of the damper plate, due to the need for these axial spacers to pass through it, such an arrangement also has two further consequences.

First of all, the total number of annular plates or wheels around the hub is increased, to the detriment of the axially extending bulk of the assembly, and at the cost of a significant complexity of the assembly, which is inevitably relatively expensive.

In addition, the two auxiliary plates which are thus provided must in practice constitute the two plates which are in the axial sense the outermost plates of the assembly. This means that standardisation to an arrangement in which it would by contrast be the plates of the third part (one of which carries the friction disc where the assembly is a friction clutch for an automotive vehicle) which are axially the outermost ones, cannot be adopted.

BRIEF DESCRIPTION OF THE INVENTION

An object of the present invention is to provide a torsion damping device which is free of the above mentioned disadvantages and which in addition has other advantages.

The torsion damping device in accordance with the invention is basically of the kind defined above, but is in general further characterised in that circumferentially acting resilient means, separate from each other, are operatively disposed between, on the one hand, said hub and one of said damper plates, and on the other hand said hub and the other of the said damper plates. With this arrangement, it is no longer necessary to double up on one of the damper plates, while the total number of components to be employed is reduced, to the benefit of the axial bulk of the assembly and leading also to greater simplicity of construction for the latter.

Consequently it is possible, if desired, to differentiate, between the main circumferentially acting resilient means, interposed between the first and second parts, according to the circumferential direction of operation.

A final result is that it is also possible, if desired, to leave on the outside of the torsion damping device the two annular plates which are part of the third part of the device, so that both of the single damper plates can then be located within the space axially defined between the annular plates of the third part.

In a preferred embodiment of the invention, the two said damper plates are disposed axially side by side, with the device further comprising a spacer ring acting as a friction ring and the said damper plates being axially separated locally by the said spacer ring alone.

Consequently, the two damper plates can advantageously be made identical to each other, with simple rotation of one of them with respect to the other during assembly.

According to a further feature of the invention, the damper plates are provided with circumferential corrugations each comprising two half waves, the two half waves of each corrugation having, considered circumferentially, different amplitudes from each other whereby, when one said damper plate rotates with respect to the other, the said damper plates may advantageously be at least partly interleaved axially with each other. This reduces the axial bulk of the assembly.

The features and advantages of the invention will become more apparent from the description which follows, and which is given by way of example and with reference to the accompanying drawings.

DESCRIPTION OF THE PREFERRED EMBODIMENT

The accompanying drawings show, by way of example, the application of the invention to a friction clutch, intended for an automotive vehicle.

In general, the torsion damper which is incorporated in the friction clutch comprises three coaxial parts A, B and C, mounted so as to be rotatable with respect to each other within the limits of a predetermined angular displacement and against the action of resilient means (conventionally referred to as circumferentially acting resilient means). The resilient means are adapted to act circumferentially between the three coaxial parts over at least part of a said angular displacement.

The first part A comprises a simple hub 10 which is arranged to be rotatable on the input shaft of the gearbox of the vehicle, this being a driven shaft. For this purpose the bore 11 of the hub 10 is splined.

The second part B includes a plate or wheel 12, which extends transversely as an annular member around the hub 10. The plate 12 will be referred to in this description as a damper plate. The damper plate and the hub 10 engage with each other through relative rotational displacement means 13.

Figure 3:
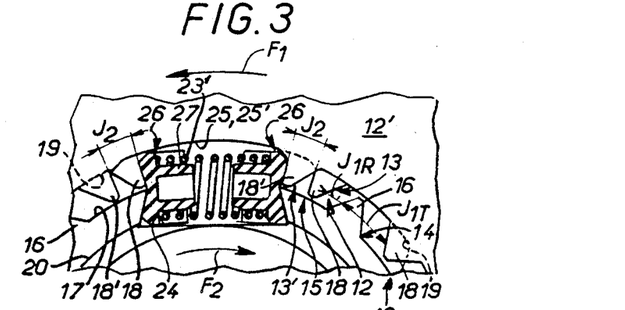
FIG. 3 shows, on a larger scale, the detail which is indicated within the phantom rectangle III in FIG. 1.

These displacement means 13 include two sets of teeth 14 and 15 (which are referred to herein for convenience as the conjugate teeth). One of the sets of conjugate teeth, 14, is on the outer periphery of the hub 10, while the other set, 15, is arranged around the inner periphery of the damper plate 12, as is best seen in FIG. 3.

The set of teeth 14 comprises a plurality of teeth 16, equally spaced alternately with recesses 17. Similarly the set of teeth 15 comprises a plurality of teeth 18, equally spaced around the circumference and alternating with recesses 19. The teeth 16 and 18 are engaged in the corresponding recesses 19 and 17 respectively. The circumferential development of the recesses 19 in the damper plate 12 is greater than that of the teeth 16, measured along a common pitch circle which passes, for example, through the mid height of the teeth 16 in the hub 10. The set of teeth 14 in the hub 10 extends in the axial direction over only the middle portion of the latter, in which they project from a cylindrical base ring 20. The set of teeth 15 of the damper plate 12, on the other hand, extends over the whole axial length of the damper plate.

The part B of the torsion damper also includes a second damper plate 12', which like the damper plate 12 (but independently of the latter), is in the form of a transversely extending annular member surrounding the hub 10. Between the plate 12' and the hub 10, relative rotational displacement means 13' are provided. As between one of the two damper plates 12, 12' and the other, the corresponding relative rotational displacement means 13, 13' are disposed alternately. Consequently, for a first circumferential direction of relative angular displacement between the part A and the part B, only one of the damper plates 12, 12' initially operates; while in the opposite direction of angular displacement the other damper plate is the one which initially operates by itself.

The two damper plates 12 and 12' are identical to each other. They are designated by different reference numerals in this example purely to enable them more easily to be distinguished from each other. The same is true for the other components associated with the damper plates 12 and 12'.

It can be seen from the foregoing that the relative rotational displacement means 13' comprise two conjugate sets of teeth, one on the hub 10 and the other on the damper plate 12'.

The set of teeth 14 on the hub 10 is made so as to extend in the axial direction over a sufficient length to be common to both of the damper plates 12 and 12'. In addition, the set of conjugate teeth 15' of the damper plate 12' comprises teeth 18' which are regularly spaced circumferentially, alternately with recesses 19' so as to be able to engage in a common plane with the set of teeth 15 of the damper plate 12. Thus the circumferential developement of the recesses 19' is equal to that of the recesses 19, and is therefore greater than that of the teeth 16 of the hub 10.

In accordance with the invention, separate circumferentially acting resilient means are provided between, on the one hand, the hub 10 of the part A and one of the damper plates 12 and 12' of the part B; and, on the other hand, the hub 10 of part A and the other damper plate 12 or 12' of part B.

The damper plates 12 and 12' are axially offset, with the circumferentially acting resilient means which are associated with them extending respectively into zones axially offset with respect to each other to the right of the respective damper plates 12 and 12'.

In this example the damper plates 12 and 12' are axially disposed side by side, and are only locally separated in the axial sense in operation, this separation being obtained by means of a spacer ring 22 which acts as a friction ring.

The resilient means associated with the damper plates 12 and 12' thus themselves lie side by side in the axial sense.

For each of the plates 12 and 12', the resilient means comprise at least one resilient member 23, 23', interposed circumferentially between the hub 10 and a plate 12 or 12'.

Each of these resilient means is a spring of the coil type, which is disposed substantially tangentially with respect to a circumference of the assembly, and which is housed partly in a notch 24 which forms a local interruption in the set of teeth 14 of the hub 10, and partly in a notch 25 or 25' which forms a local interruption of the set of teeth 15 or 15' of the corresponding damper plate 12 or 12'. The notch 24 also extends into the cylindrical support ring 20 of the hub 10, over the whole length of the support ring 20.

Two resilient members 23, 23', which are so mounted as to be under a slight precompression, are thus provided between the parts A and B for each of the damper plates 12 and 12', in positions which are generally diametrically opposed to each other.

There are two notches 24 in the hub 10, while similarly each of the plates 12 and 12' has two notches 25, 25'.

The springs 23 and 23' are, in practice, of relatively low stiffness, for the purpose of filtering out dead point or deceleration noises.

Each of the springs 23, 23' is carried at each of its ends on the hub 10 and/or the appropriate damper plate 12 or 12', by means of a thrust member 26.

Figures 13, 14, 15, 16A:
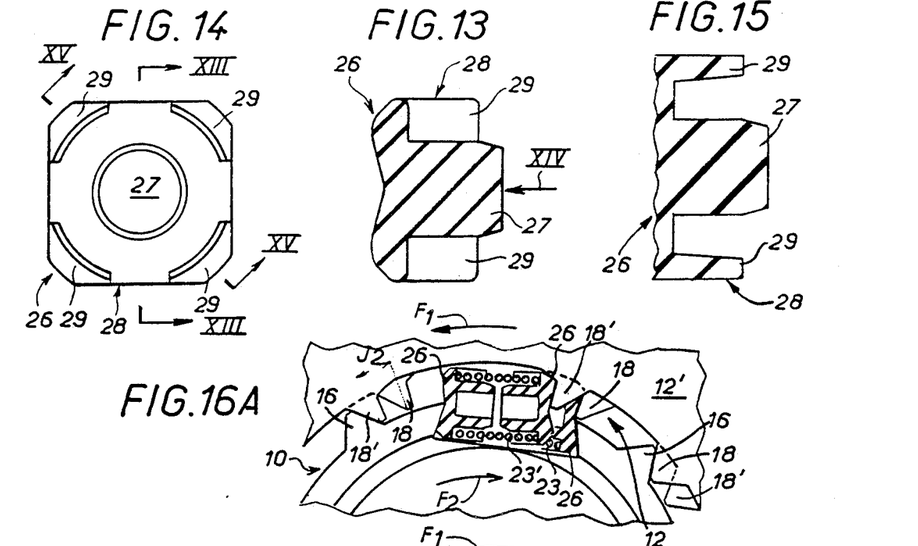
FIG. 13 is a view in axial cross section taken on the line XIII—XIII in FIG. 14, and shows on a larger scale one of the thrust members which are also included in the torsion damper arrangement according to the invention at each of the circumferential ends of the main circumferentially acting resilient means which are interposed between its first and second parts.
FIG. 14 is a view of this thrust member, seen in elevation in the direction of the arrow XIV in FIG. 13.
FIG. 15 is another view of the same thrust member in axial cross section taken on the line XV—XV in FIG. 14.
FIGS. 16a and 16b are views similar to FIG. 3, but showing two successive stages in the operation of the torsion damper arrangement according to the invention.

In one embodiment of the invention, as shown in FIGS. 13 to 15, such a thrust member 26 comprises in combination, on the one hand a central centring pin 27, on to which the associated spring 23 or 23' is engaged; and on the other hand a peripheral retaining skirt 28 which surrounds the spring.

The thrust members 26 are generally square in shape as seen in plan, while the peripheral retaining skirt 28 is divided into distinct segments 29, with one of these segments 29 at each corner of the square.

The thrust members 26 that are associated with different resilient members 23 and 23', are thus disposed in a common notch 24 of the hub 10, with each member 26 engaging one end of the corresponding one of the resilient members 23 and 23'.

The third part C of the torsion damper comprises at least one wheel or plate member which, like the damper plates 12 and 12', and parallel with these, comprises a transversely extending annular member surrounding the hub 10. It is however not coupled with the hub 10: that is to say there are no relative rotational displacement means between it and the hub.

Figure 10:
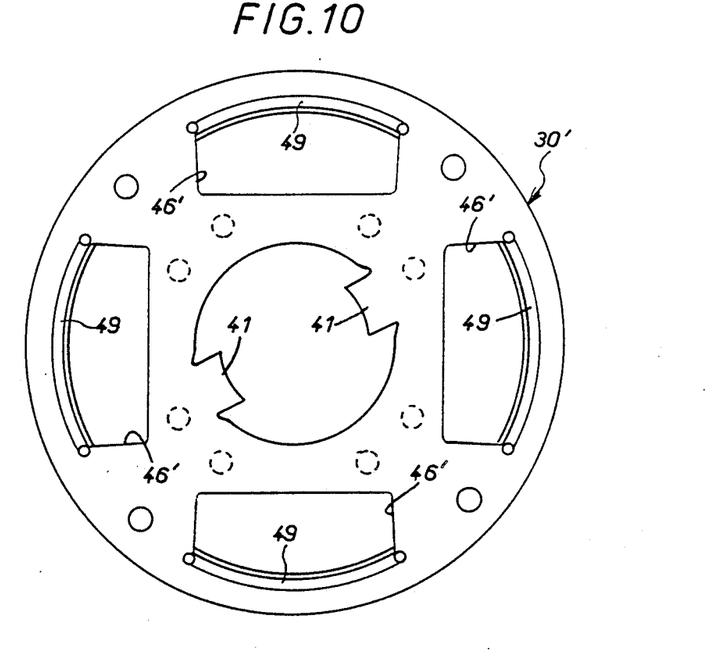
FIG. 10 is an elevation of one of the guide rings which also forms part of the torsion damper arrangement.

In this example the part C has two of these plates, 30 and 30', which are identical with each other. In FIG. 10, the plate 30' is shown by itself.

The plates 30 and 30' are located axially at a distance from each other and parallel to each other, and are rotatable together, for which purpose they are connected together by axial spacers 31. The plates 30 and 30' enclose the two damper plates 12 and 12' between them, and in this connection the axial spacers 31 extend through the damper plates 12 and 12' via openings 32 and 32', provided in the latter for this purpose. There are four of the axial spacers 31, each displaced by about 90° from the next. Consequently there is an equal number of the openings 32 and 32'.

The part C also includes a friction disc 33. The carrier plate 34 of this disc 33 is mounted on the back of one of the plates 30, 30', in this example the plate 30, the surface of which is therefore doubled.

In its outer peripheral portion the carrier plate 34 carries friction linings 35 disposed in a ring on both sides.

By engagement of the linings 35 between a pressure plate and a reaction plate, not shown, the part C is adapted to be coupled in rotation with a driving shaft, which in this example is the output shaft of the engine of the vehicle.

Figure 11:
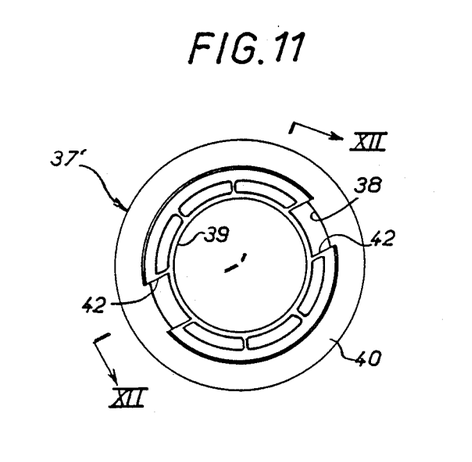
FIG. 11 is a view, seen in elevation in the direction of the arrow XI in FIG. 12, of the bearing asssociated with such a guide ring.
Figure 12:
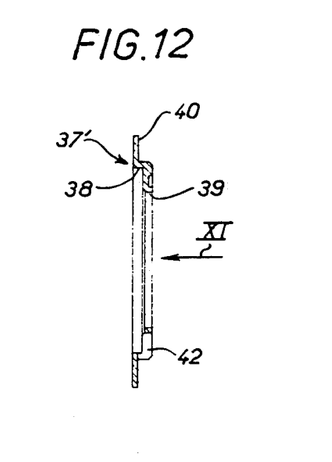
FIG. 12 is a view of this bearing in axial cross section, taken on the line XII—XII in FIG. 11.

For the purpose of centring the part C with respect to part A, a bearing 37, 37' is radially interposed between each of the plates 30, 30' respectively and the hub 10, at the inner periphery of the plate 30 or 30'. The two bearings 37 and 37' are identical to each other, the bearing 37' being shown by itself in FIGS. 11 and 12.

Figure 4:
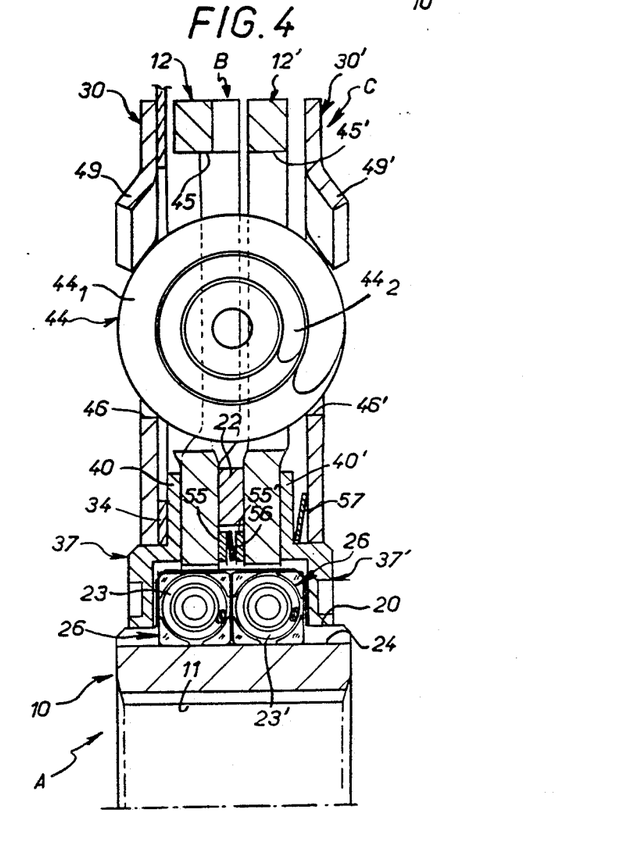
FIG. 4 likewise shows on a larger scale the detail within the phantom rectangle IV in FIG. 2.
Figure 5:
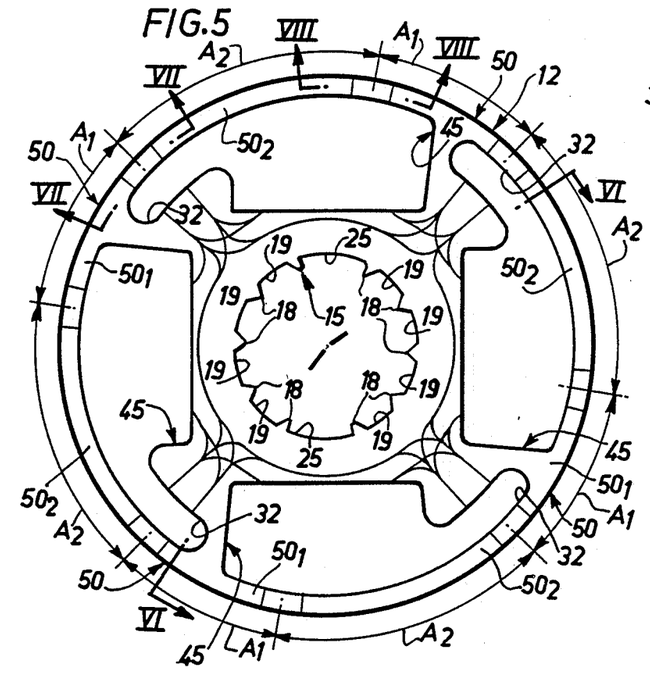
FIG. 5 is a view in elevation, seen in the direction of the arrow V in FIG. 6, of one of the damper plates used in the torsion damper.
Figure 6:
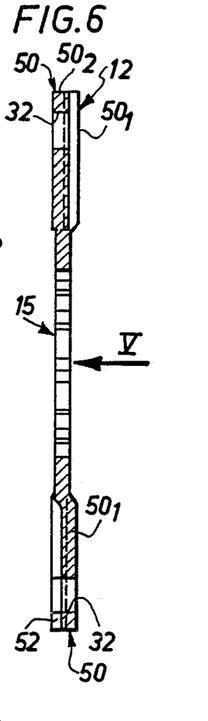
FIG. 6 is a view in axial cross section of the same damper plate, taken on the line VI—VI in FIG. 5.
Figure 7:
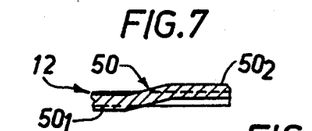
FIG. 7 is a view in circumferential cross section of part of the same damper plate, developed in a single plane and taken on the line VII—VII in FIG. 5.
Figure 8:
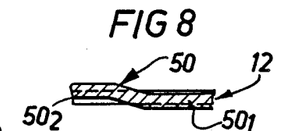
FIG. 8 is a view similar to FIG. 7, showing another portion of the damper plate, the section being taken on the line VIII—VIII in FIG. 5.

Referring to these FIGS., the bearing comprises a middle portion 38 which is generally cylindrical. The corresponding plate 30 or 30' (see FIG. 4) is carried by its inner periphery on the middle portion 38. A first flange 39 and a second flange 40 are disposed respectively at the ends of the middle portion 38. The flange 39 extends radially towards the axis of the assembly, and bears through its inner periphery on the cylindrical support ring 20 (FIG. 3) of the hub 10. The flange 40 extends radially in the opposite direction to the said axis, and is inserted axially between, on the one hand, the corresponding plate 30 or 30' and, on the other hand, the damper plate 12 or 12', in contact with the respective damper plate (see FIG. 4).

Each of the bearings 37, 37' is rotatable on the plate 30 or 30' with which it is associated. To this end, each of the plates 30, 30' has at least one tongue 41 projecting radially from its inner periphery (FIG. 1), with the tongue 41 engaging with a notch 42 of similar shape which is formed correspondingly so as to interrupt the flange 39 and the middle part 38 of the corresponding bearing 37 or 37'.

Each of the plates 30 and 30' has two of these tongues 41, in positions which are diametrically opposed to each other, while each bearing 37, 37' similarly has two of the notches 42.

The circumferentially acting resilient means which are imposed circumferentially between the part B and the part C comprise a plurality of resilient members 44, which are evenly spaced around a pitch circle and which are disposed substantially tangentially to a common pitch circle of the assembly. In this example there are four of these resilient members 44, defining substantially a cruciform pattern. Each resilient member 44 consists of two coaxial coil springs $44_1$ and $44_2$.

These resilient members 44 are identical with each other and are generally of higher stiffness than the resilient members 23 and 23'. The resilient members 44 are mounted individually partly on the one hand in openings 45, 45' in the damper plates 12 and 12' respectively, and on the other hand in openings 46, 46' in the plates 30 and 30' respectively. The openings 45, 45' are defined by apertures through the plates 12 and 12', while the openings 46, 46' are similarly defined by apertures through the plates 30, 30'. In this example the openings 45, 45', 46 and 46' all show the same circumferential development.

When the assembly is in a state of rest (FIGS. 1 and 2), these openings are all in axial register with each other both in respect of one of their circumferential edges and in respect of the other.

A washer 47 is provided between each of the circumferential ends of the resilient members 44 and the circumferential terminal edges of the corresponding openings 45, 45',46 and 46', each washer 47 having a boss portion 48 projecting from its central zone, and formed for example by stamping. The corresponding resilient member 44 is centred on the boss 48.

The plates 30 and 30' serve as guide rings for the resilient members 44, for which purpose they have an abutment portion 49 which projects outwardly and at an angle with respect to the axis of the assembly. The abutment portions 49 also serve to maintain the resilient members 44 in position. Each abutment portion 49 extends along the furthest one of the circumfential edges of the corresponding opening 46 or 46' from the axis of the assembly, this circumferential edge extending in an arc which is centred on the said axis.

The openings 32 and 32' in the damper plates 12 and 12' are in the form of simple local extensions, shaped like the fingers of a glove, of the openings 45 and 45'. In both of the plates 12 and 12', these openings 32 and 32' extend circumferentially, all in the same direction, and are centred on the axis of the assembly. That one of their circumferential edges which is furthest from the said axis is continuous with the corresponding circumferential edge, itself of arcuate form, of the opening 45 or 45' of which it is an extension.

Although the damper plates 12 and 12' are generally flat, they are provided, in their peripheral zone which includes the openings 45 and 45', with corrugations 50 whereby at least one of the radial edges of the openings 45, 45' is offset axially towards the median zone of the resilient members 44, so as to improve the seating of the said radial edge with respect to the corresponding resilient member 44.

There is generally one corrugation 50 for each opening 45 or 45' of the damper plates 12, 12'.

Preferably, and as shown in FIGS. 5 to 9, the two "half waves" $50_1$, $50_2$ which constitute such a corrugation 50 have different amplitudes $A_1$, $A_2$ considered in the circumferential direction. As a result, on rotation of one of the damper plates 12, 12' with respect to the other (FIG. 9), these plates are at least partly interleaved axially with each other.

Figure 9:
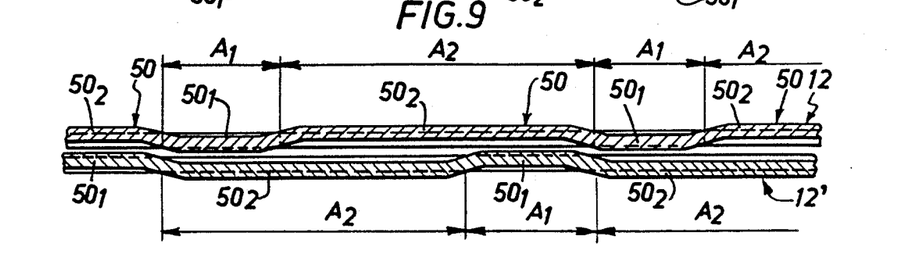
FIG. 9 is another circumferential cross sectional view developed in a single plane, including the views seen in FIGS. 7 and 8 and showing the relative disposition of two damper plates which are used in the torsion damper according to the invention.

In other words, if each of the damper plates is regarded as being hollow with respect to the plane which (because of the relative disposition of the plate 12' with respect to the plate 12) can be regarded as the "general" plane of the plate concerned, then each half wave $50_1$ of either one of the plates 12 or 12' can be considered to project from the general plane of the latter, and lies facing a half wave $50_2$ of the other damper plate 12' or 12.

It is even possible for the half waves $50_1$ to penetrate at least partly in the axial direction into the half waves $50_2$.

Because the circumferential developments $A_1$ and $A_2$ are different from each other, a relative angular displacement between damper plates 12 and 12' is possible.

Figure 1:
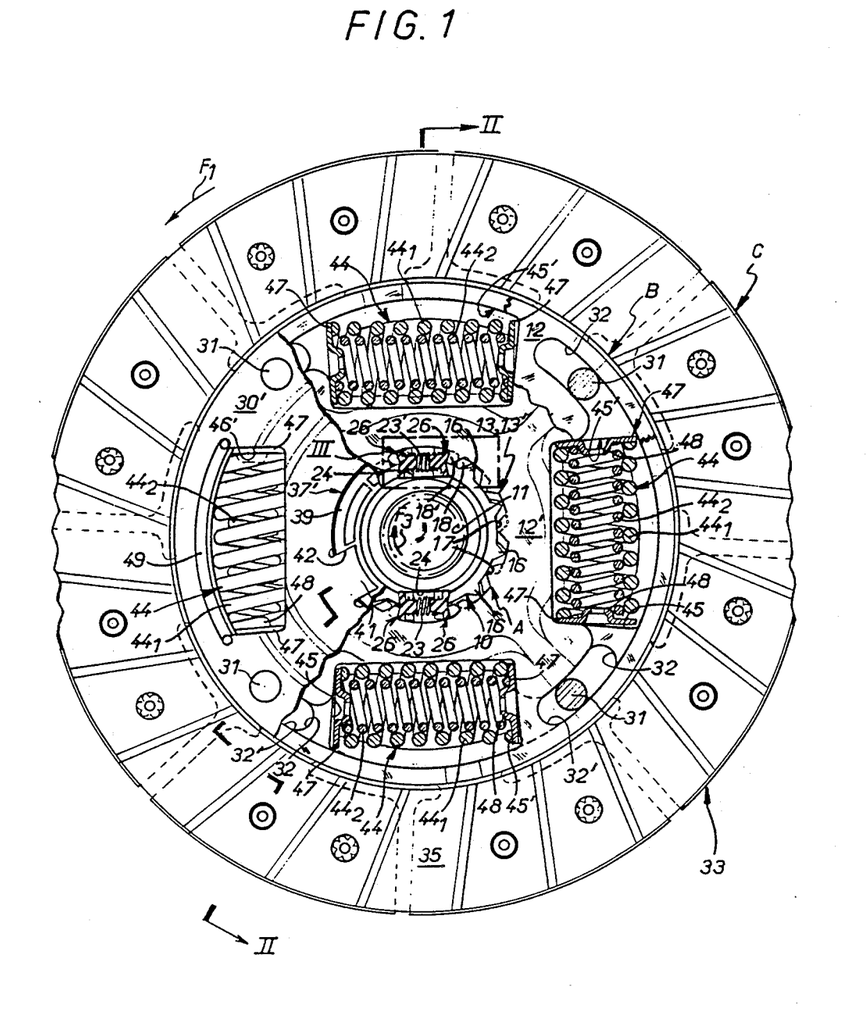
FIG. 1 is a view generally in elevation in the direction of the arrow I in FIG. 2, showing part of a torsion damper arrangement according to the invention, with some parts shown locally cut away.
Figure 2:
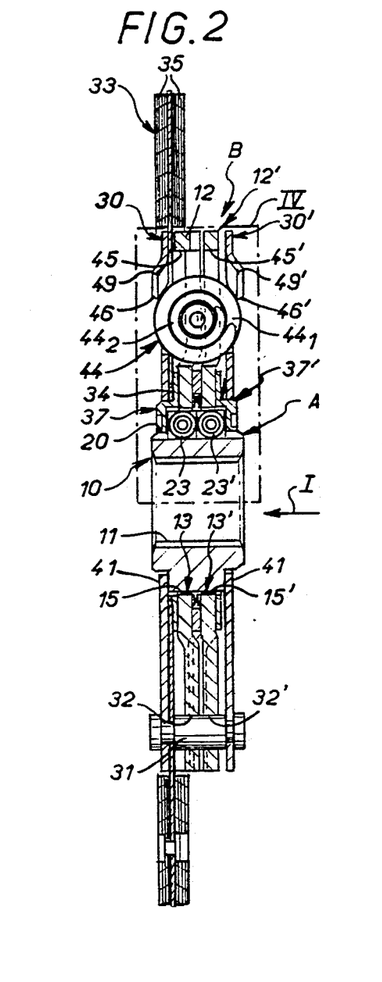
FIG. 2 is a view in axial cross section of the same torsion damper arrangement, taken on the line II—II in FIG. 1.

In the following description, it will be supposed that in the direction of rotation of the assembly which, indicated by an arrow F1 in FIG. 1, corresponds to forward movement of the vehicle, the openings 32 in the plate 12 extend circumferentially in the same direction with respect to the openings 45.

As a result of relative rotation of the damper plate 12' with respect to the damper plate 12, the openings 32' of the plate 12' extend in this case, with respect to the openings 45', in the circumferential direction which is opposite to that indicated by the arrow F1.

The dispositions are such that, when the assembly is at rest, the damper plate 12 is in engagement (against the resilient members 23 through the appropriate thrust members 26) only through that one of the radial flanks of its openings 25 which is the leading one, considered in the direction indicated by the arrow F1.

On the other hand, a circumferential clearance J2 (FIG. 3) exists between the other one of the radial flanks of the openings 25 and the corresponding thrust member 26 at the other circumferential end of the resilient members 23.

Having regard to (a) the relative rotation of the damper plate 12' with respect to the damper plate 12, and (b) the alternating arrangement of the relative rotational displacement means 13 and 13' by which the damper plates 12, 12' cooperate with the hub 10, a further circumferential clearance J2 exists between, on the one hand, the radial flank of the openings 25' which is the leading one (considered in the circumferential direction indicated by the arrow F1), and, on the other hand, the associated thrust member 26 at the corresponding circumferential end of the resilient members 23'. However, the damper plate 12' bears against the resilient members 23' through the radial flank of the openings 25' which is behind in the above mentioned circumferential direction through the appropriate thrust members 26.

It follows from the foregoing that, generally, when the assembly is at rest, the sets of teeth 15 and 15' of the damper plates 12 and 12' respectively, and thus their teeth 18 and 18', are circumferential clearance J2.

Similarly, each of the teeth 16 of the hub in this rest condition lies spaced in the circumferential direction indicated by the arrow F1 from a tooth 18 of the plate 12, by a circumferential distance J1R, while on the other hand it is spaced in the opposite circumferential direction from a tooth 18' of the plate 12' by a circumferential distance J1T.

As can be seen from FIG. 3, the circumferential distances J1R and J1T are different, the latter being larger than the former. However, if desired these circumferential distances J1T and J1R may be made equal to one another.

In the next part of this description, it will be presupposed for convenience that the circumferential distance J1T is in fact equal to the distance J2.

Between the three parts A, B and C, friction means are also interposed axially. These friction means comprise firstly two friction rings 55 and 55', which are disposed axially between the damper plates 12 and 12' and radially inwards of the spacer ring 22. Both are made to be rotatable with the hub 10 by means of an appropriate set of teeth (not shown in the drawings). Each of the friction rings 55 and 55' bears against the corresponding damper plate 12, 12', and is biassed axially towards the latter by means of a resilient ring 56 (a Belleville washer) which is interposed axially between them.

The friction means also include the flanges 40 of the bearings 37 and 37', these radial flanges 40 being axially subjected to the axial forces exerted by a resilient washer 57 lying between one of them and the corresponding plate 30 or 30'. The resilient washer 57 is also a Belleville washer, and it is disposed between the plate 30' which is opposed to the plate having the carrier plate 34 of the friction disc 33 attached to its back, and the radial flange 40 of the corresponding bearing 37'.

In operation, and in the "driving" mode (in which it is the engine which tends to drive the vehicle), it is normally the input part C that is the driving part, while the output part A is then a driven part.

Figure 16B:
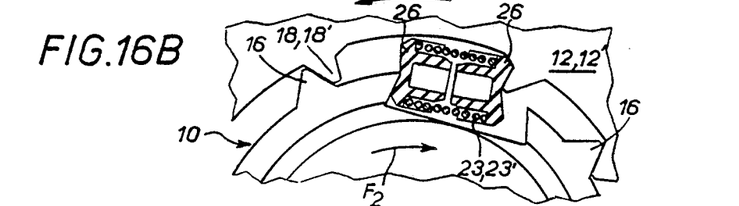

For simplicity of description, it will however be assumed here that it is the part A which, in accordance with the arrow F2 in FIGS. 3, 16a and 16b, tends to drive the assembly in the circumferential direction opposed to that indicated by the arrow F1 mentioned above.

Initially, then, only the hub 10 rotates, in accordance with the arrow F2, while the damper plates 12 and 12' remain stationary, being locked together in a rotational sense by the resilient members 44, and also locked in the rotational sense by the latter to the plates 30 and 30'.

Thus only the resilient members 23' (FIG. 16a) are operative at this stage, these members 23' being in endwise engagement with the damper plate 12' which is assumed to be stationary. The members 23' are thus subjected to a compressive force, the magnitude of which depends on the rotation of the hub 10. By contrast, the resilient members 23 associated with the damper plate 12, being pushed by the hub 10 without being in endwise engagement with the damper plate 12, are of no effect.

This first phase of operation continues until, as seen in FIG. 16a, the circumferential distance J1T between the teeth 16 of the hub 10 and the teeth 18' of the damper plate 12' has been reached.

In the circumferential direction under consideration, the resilient members 23 are spaced from the leading radial flank of the openings 25 in the plate 12, by the clearance J2. Now if, as indicated above, this distance J2 is equal to the circumferential distance J1T mentioned above, then these resilient members 23 simultaneously come into abutment against the damper plate 12 through the corresponding thrust members 26. In this case again, the resilient members 23 remain ineffective throughout the first operating phase.

It will be clear that the same will be true if the circumferential distance J2 is greater than the circumferential distance J1T.

By contrast, if the circumferential distance J2 is less than the circumferential distance J1T, the resilient members 23 associated with the plate 12 will come into abutment against the latter before the circumferential distance J1T has been reached, and, because the plate 12 is then fixed with respect to the hub 10, they are from that instant subjected to a compressive force from the hub 10, as are the resilient members 23'. The forces exerted by the members 23 and 23' are then associated with each other, so that they contribute towards an aggregated stiffness of the circumferentially acting resilient means, which thus couple the parts A and B together.

From the moment when the circumferential distance J1T is reached, so that the hub 10 is then in abutment through its teeth 16 against the teeth 18' of the plate 12', the hub 10, if its rotation in accordance with the arrow F2 in FIG. 16a is continued, then drives the plate 12' with it in the same circumferential direction.

Figure 17A:
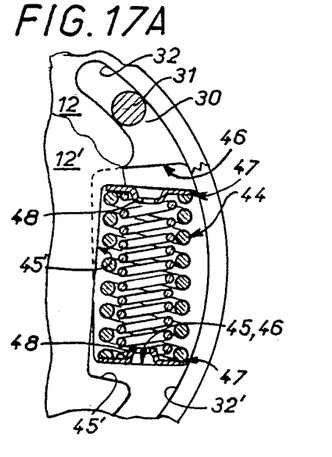
FIGS. 17a and 17b are views similar to a portion of FIG. 1 and showing other successive stages in the operation of the torsion damper.

This initiates a second operating phase, during which,—and in spite of the fact that the resilient members 23' associated with the damper plate 12' remain in the compressed state (FIGS. 16a and 16b)—there is a progressive compression of the resilient members 44 between, on the one hand the plates 30 and 30' which remain stationary, and, on the other hand, the damper plate 12' which is thus driven by the hub 10. See FIG. 17a.

The resilient members 44 then add the forces which they exert to those exerted by the resilient members 23'.

It will be understood that the same is true of the resilient members 23 if they have already begun to be compressed.

Under all circumstances, if the rotation of the hub 10 in the circumferential direction indicated by the arrow F2 in FIGS. 3, 16a and 16b is continued, with the result that, since the damper plate 12', being driven by the hub 10, is subjected to relative rotation with respect to the damper plate 12, the circumferential distance J2 between the teeth 18' of the damper plate 12' and the teeth 18 of the damper plate 12 tends to be eliminated, then there is an instant at which, if they have not already been compressed, the resilient members 23 come into operation in their turn, so adding their own effects to those of the resilient members 23' as well as to those of the resilient members 44.

As will be understood, the peripheral skirt 28 of the thrust members 26 is of advantage in avoiding interference of the thrust members 26 with each other during the relative rotation of the damper plates 12 and 12'. It also improves the operating conditions for the resilient members 23 and 23' by restraining them in a lateral position.

When, as is shown in FIG. 16b, the circumferential distance J2 is absorbed, and when in consequence the hub 10, while still driving the damper plate 12' with it, comes into abutment through its teeth 16 against the teeth 18 of the damper plate 12, the resilient members 23 associated with the damper plate 12 are then in the same state of compression as are the resilient members 23' associated with the damper plate 12'.

From this instant onwards, the hub 10 simultaneously drives both of the damper plates 12 and 12', while compression of the resilient members between the plates 30, 30' and the damper plate 12' continues.

Figure 17B:
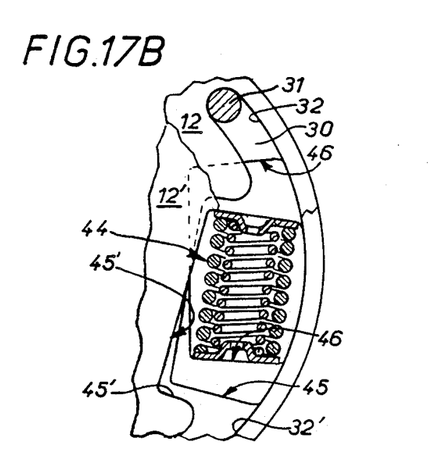

This second phase of operation continues until the bottom of the openings 32 comes into abutment against the axial spacers 32 (FIG. 17b). From then onwards, if the driving of the hub 10 in the circumferential direction indicated by the arrow F2 continues—and this normally corresponds to the case in which there is an over torque in the transmission—there is a positive driving action of the various parts A, B and C of the torsion damper by each other.

In this way, in the "driving" mode, the damper plate 12' acts by itself first of all during the relative angular movement between the part A and the part B.

If, in the operating mode known as "retro", the vehicle tends to drive the engine, a process takes place which is the reverse of the foregoing.

It is then, however, the damper plate 12 which initially operates alone, after absorption of the circumferential clearance J1R.

As will be easily understood, the friction rings 55 and 55' act by themselves during the first operating phase, while during the second operating phase, the radial flanges 40 of the bearings 37 and 37' become operative, with the spacer ring 22 above them, during an initial period corresponding to the relative rotation between the damper plates 12 and 12'.

It is of course not necessary for the two damper plates to be identical with each other, although it is advantageous if they are, since this clearly simplifies the construction of the apparatus. Similarly the members 44 may be of different stiffnesses.

What is claimed is:

1. A torsion damping device for an automotive vehicle, said damping device comprising three coaxial parts mounted rotatably with respect to each other within the limits of a predetermined angular displacement, first resilient means for acting circumferentially between said coaxial parts over at least a part of the angular displacement, said coaxial parts comprising:

a first part comprising a hub, a second part comprising two damper plates, each of said damper plates comprising, independently of the other, an annular member extending transversely around said hub, relative rotational displacement means between each said damper plate and said hub by which said damper plates cooperate with said hub, said relative rotational displacement means being disposed alternately as between one of said damper plates and the other, whereby, in a first circumferential direction of angular displacement between said first and second parts, one of said damper plates initially operates by itself, while for angular displacement in the opposite circumferential direction, and other of said damper plates initially operates by itself, and a third part, comprising at least one further plate, being like said damper plates and in parallel therewith, constitutes an annular member extending transversely around said hub, said third part being free of relative rotational means with said hub, said damping device further comprising second circumferentially acting resilient means for biasing said damper plates with said hub, said second circumferentially acting resilient means being separate from one another and being axially offset to each other and are operatively disposed between, on the one hand, said hub and one of said damper plates, and on the other hand said hub and the other of said damper plates.

2. A torsion damping device according to claim 1, wherein said second circumferentially acting resilient means each extends side by side in an axial direction of said damping device.

3. A torsion damping device according to claim 1, wherein for each of said damper plates, said second circumferentially acting resilient means is at least one resilient member circumferentially interposed between said hub and said damper plate.

4. A torsion damping device according to claim 1, wherein said two damper plates are disposed axially side by side, said damper device further comprises a spacer ring acting as a friction ring, said damper plates being axially separated locally by said spacer ring alone.

5. A torsion damping device according to claim 4, wherein said third part comprises two plates extending transversely and mounted at an axial distance from each other and parallel to each other, said damping device further comprises means mounting said two plates of said third part so as to be rotatable one with the other, said two damper plates both being disposed within the space defined axially between said two plates of said third part.

6. A torsion damping device according to claim 5, wherein said two damper plates are identical to each other.

7. A torsion damping device for an automotive vehicle, said damping device comprising three coaxial parts mounted rotatably with respect to each other within the limits of a predetermined angular displacement, first resilient means for acting circumferentially between said coaxial parts over at least a part of the angular displacement, a first part of said coaxial parts comprising a hub, a second part of said coaxial parts comprising at least two damper plates, each of said damper plates comprising, independently of the other, an annular member extending transversely around said hub, relative rotational displacement means between each said damper plate and said damper hub by which said damper plates cooperate with said hub, said relative rotational displacement means being disposed alternately as betwen one of said damper plates and the other, whereby, in a first circumferential direction of angular displacement between said first and second parts, one of said damper plates initially operates by itself, while for angular displacement in the opposite circumferential direction, the other of said damper plates initially operates by itself, and a third part of said coaxial parts comprising at least one further plate, being like said damper plate and in parallel therewith, constitutes an annular member extending transversely around said hub, said third part being free of relative rotational means with said hub, said damping device further comprising second circumferentially acting resilient means for biasing said damper plates with said hub, said second circumferentially acting resilient means being separate from one another and being axially offset to each other and are operatively disposed between, on the one hand, said hub and one of said damper plates, and on the other hand, said hub and the other of said damper plates, said two damper plates being disposed axially side by side, said damper device further comprising a spacer ring acting as a friction ring, said damper plates being axially separated locally by said spacer ring alone, said third part comprising two plates extending transversely and mounted at an axial distance from each other and parallel to each other, said damping device further comprising means mounting said two plates of said third part so as to be rotatable one with the other, said two damper plates both being disposed within the space defined axially between said two plates of said third part, said two damper plates being identical to each other, said damper plates being provided with circumferential corrugations each comprising two half waves, the two half waves of each corrugation having, considered circumferentially, different amplitudes from each other whereby, when one of said damper plates rotates with respect to the other, said damper plates are at least partly interleaved axially with each other.

* * * * *